United States Patent
Barlag et al.

(10) Patent No.: US 8,746,315 B2
(45) Date of Patent: Jun. 10, 2014

(54) APPARATUS FOR THE PRODUCTION OF AN AIRCRAFT FUSELAGE SHELL CONSISTING OF A FIBRE COMPOSITE

(75) Inventors: Carsten Barlag, Jever (DE); Joachim Piepenbrock, Buxtehude (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 13/525,564

(22) Filed: Jun. 18, 2012

(65) Prior Publication Data

US 2012/0279662 A1    Nov. 8, 2012

Related U.S. Application Data

(63) Continuation of application No. PCT/EP2010/069056, filed on Dec. 7, 2010.

(60) Provisional application No. 61/287,855, filed on Dec. 18, 2009.

(30) Foreign Application Priority Data

Dec. 18, 2009 (DE) .......................... 10 2009 059 720

(51) Int. Cl.
    *B29C 65/78*    (2006.01)
(52) U.S. Cl.
    USPC ....... 156/560; 156/562; 414/331.16; 414/589
(58) Field of Classification Search
    USPC .......... 156/297, 559, 560, 561, 562; 414/268, 414/287, 331.14, 331.16, 589; 425/340, 425/342.1, 343; 244/119
    See application file for complete search history.

(56) References Cited

U.S. PATENT DOCUMENTS

| | | | |
|---|---|---|---|
| 2,458,788 A * | 1/1949 | Lewis et al. .................. 156/391 |
| 3,971,688 A * | 7/1976 | Abbott .......................... 156/295 |
| 4,640,734 A * | 2/1987 | Roberts et al. ................ 156/562 |
| 5,135,382 A | 8/1992 | Tsuchiya et al. |
| 6,306,239 B1 | 10/2001 | Breuer et al. |
| 7,897,095 B2 | 3/2011 | Raeckers |
| 8,220,154 B2 | 7/2012 | Cacciaguerra |
| 2003/0046801 A1* | 3/2003 | Engstrom et al. ............ 29/281.4 |

(Continued)

FOREIGN PATENT DOCUMENTS

| | | |
|---|---|---|
| CN | 101189118 A | 5/2008 |
| CN | 101365579 A | 2/2009 |

(Continued)

*Primary Examiner* — William Bell
(74) *Attorney, Agent, or Firm* — Lerner, David, Littenberg, Krumholz & Mentlik, LLP

(57) ABSTRACT

An apparatus for the production of a fuselage shell for an aircraft made of fiber composite, which is to be equipped with a plurality of stringers disposed spaced apart for reinforcement, comprising a main frame to form a supporting substructure having an outwardly curved mounting surface for positive mounting, having longitudinal mounting grooves for receiving of formed parts for deformably positioning the stringers relative to the mounting surface, wherein a plurality of short formed parts spaced apart from each other are disposed in each mounting groove, and which are adjustable relative to the corresponding mounting groove in the transverse direction (Y) by means of adjusters, and which can be raised in the vertical direction (Z) by means of lifters for guiding the stringers in the direction of a laminating adhesive bonding unit brought over the mounting surface.

11 Claims, 2 Drawing Sheets

(56) References Cited

U.S. PATENT DOCUMENTS

2006/0108058 A1    5/2006   Chapman et al.
2007/0176323 A1    8/2007   Jones et al.
2008/0029644 A1    2/2008   Martinez Cerezo et al.
2008/0283668 A1*  11/2008   Martinez Cerezo et al. . 244/133
2010/0038024 A1*   2/2010   Brandt .......................... 156/249
2012/0152461 A1    6/2012   Luebbering et al.

FOREIGN PATENT DOCUMENTS

| CN | 101448627 A | 6/2009 |
| CN | 101505947 A | 8/2009 |
| DE | 19832441 C1 | 1/2000 |
| DE | 10331358 A1 | 2/2004 |
| DE | 102007061431 A1 | 6/2009 |
| GB | 2316036 A | 2/1998 |

* cited by examiner

US 8,746,315 B2

APPARATUS FOR THE PRODUCTION OF AN AIRCRAFT FUSELAGE SHELL CONSISTING OF A FIBRE COMPOSITE

CROSS-REFERENCE TO RELATED APPLICATIONS

The present application is a continuation of International Application No. PCT/EP2010/069056, filed Dec. 7, 2010, published in German, which claims priority from German Application No. 10 2009 059 720.4 filed Dec. 18, 2009, and which claims the benefit of the filing date of U.S. Provisional Patent Application No. 61/287,855 filed on Dec. 18, 2009, the disclosures of which are hereby incorporated herein by reference.

AREA OF THE INVENTION

The invention relates to an apparatus for the production of a fuselage shell consisting of a fibre composite for an aircraft, which is to be equipped with a plurality of stringers disposed spaced apart from one another for reinforcement, comprising a main frame for forming a supporting substructure having an outwardly curved mounting surface for positive mounting, having longitudinal mounting grooves for receiving formed parts in a form-fit manner for deformably positioning the stringers relative to the mounting surface.

The area of application of the present invention particularly concerns the construction of aircraft. In particular, commercial aircraft or transport aircraft with large-volume fuselages are usually manufactured using the shell construction method, more specifically, the half-shell construction method. When using the shell construction method, several shells are connected with one another along the periphery to obtain a nearly round or elliptical cross-section of a fuselage. Several fuselage sections adjacent to one another—for the tailpiece, fuselage centre and cockpit sections—form the completely closed aircraft fuselage. Increasingly, fibre composite materials such as glass-fibre or carbon-fibre reinforced synthetic materials are applied for the production of aircraft fuselages. The shells are usually equipped with longitudinal reinforcement elements such as, for example, what is commonly referred to as T or Ω stringers, to be able to reinforce the fuselage and to take the loads.

BACKGROUND OF THE INVENTION

According to the generally known state of the art, shells for the production of the aircraft fuselage can be manufactured in a negative adhesive bonding unit, which is referred to as a laminating adhesive bonding unit (LABU). Fibre material and resin are applied in several layers into said negative adhesive bonding unit and hardened. Also the stringers are integrated on top of or within this layered structure. The LABU determines the desired external shape of the construction. After demoulding, a chip-producing subsequent work process is often performed before the shells modeled such can be mounted.

DE 103 31 358 A1 discloses a particular apparatus for the serial production of a fuselage shell for an aircraft consisting of a fibre composite. On a plane forming jig, a grid pattern of several support walls of different lengths is arranged such that their ends form, approximately, a semi-circle. The support walls are arranged towards the jig in angles, which are defined by the semi-circle. At the distal ends of the support walls forming the semi-circle, modular sectional profile members are arranged, which cover the gaps between the support walls and the outer surfaces and which correspond in a negative sense, as a mounting surface, to the inner shape of the integral structural component to be fabricated.

The grid pattern of the support walls as well as the division of the modular profile members is embodied such that each gap between them is arranged below the target position of each stringer. Thus the gap for the positioning of the stringer is used relative to the fuselage shell to be fabricated. A LABU matching the above described mounting device is, after the establishment of the complete structure of the shell and of the auxiliary materials is applied, exactly matching, above the mounting surface, and the encircling sealant that was applied onto vacuum foil beforehand is pre-solidified such that a vacuum-tight sealing is obtained between the vacuum skin and the LABU. Subsequently, the construction is evacuated on the side of LABU.

The fuselage shell, which is equipped with stringers, is produced by means of the apparatus described above such that, firstly, a loose film is applied to the outer surfaces of the modular profile members. Subsequently, the hollow space that is formed by the gaps between the profile members is evacuated such that the atmospheric pressure presses the foil exactly into the profile grooves and indentions. Then, the auxiliary materials can be laid on the vacuum-molded foil. In the following, stringers embedded into elongated form parts are set into the profile grooves covered by the vacuum foil. In doing so, the elongated formed parts form a kind of adapter to adjust the form between the geometry of the gap in the mounting surface and the geometry of the stringer to be processed. Depending on the fabrication process, all shell layers made of fibre composites are applied individually or as a package onto the outer surface of the modular profile members of the mounting device and the stringers covered by vacuum foil. Subsequently, a sealant is applied onto the vacuum foil in an optimized amount. By a precise bringing together of the structure onto the mounting device prepared such with the corresponding LABU, the sealant around the perimeter is solidified such that a vacuum-tight sealing between said vacuum foil and the LABU is obtained. To perform the transfer of the complete structure from the mounting device into the LABU, the side of the mounting device is aerated and, subsequently, vacuumed on the side of the LABU. Thus the complete structure is pressed against the LABU with atmospheric pressure. Eventually, the mounting device and the LABU are brought apart and the LABU is turned such that it can be subjected to a final hardening process.

By means of said continuous formed parts for the positioning of the T stringers relative to the mounting surface, a precise production of the reinforced fuselage shell can be obtained, however, the elongated formed parts are not easy to handle and difficult to produce. In addition, before every application release agents need to be applied on the elongated formed parts, and they must be cleaned as well, which requires a lot of work.

The elongated formed parts are not adjustable relative to the gap, which forms a matching mounting groove, such that narrow tolerances need to be observed during the production of the elongated formed parts. This, additionally, increases the production effort. In addition, while co-acting with the LABU, it is not possible to actively guide the stringers during the transfer process. A minimum distance is required to feed the mounting device into the corresponding LABU, which requires a movement of the mounting device in the course of the transfer process from the mounting device to the LABU—more precisely, a directed movement towards a target. In most cases, the elongated formed parts for the T stringer used up to date, however, show a different geometry for each stringer by intended local swellings at the shell layers such that a large number of said form parts must be provided in order to process the different kinds of stringers.

Often, production methods for fuselage shells comprise what is commonly called hard stringers. In these cases, stringers consisting of metal or of already hardened composite materials are applied which, therefore, cannot be processed in a non-hardened state.

BRIEF SUMMARY OF THE INVENTION

An aspect of the present invention provides an apparatus for the production of a fuselage shell consisting of a fibre composite and equipped with hard stringers, the components of which can be produced in a simple and precise manner, and which allows a reproducible high-precision serial production of stringer-reinforced fuselage shells.

An aspect of the invention includes a technical teaching that in each mounting groove of the mounting surface several short formed parts for stringers are disposed spaced apart from each other, which are adjustable relative to the corresponding mounting groove in the transverse direction Y by means of adjusters, and that can be raised in the vertical direction Z by means of lifters for guiding the stringers, and that are extendable in the direction of a LAU which can be brought over the mounting surface.

Thanks to a solution according to an aspect of the invention, the stringers do not need to be inserted into the mounting groove by means of elongated formed parts any more, but instead, into the positioning inserts created by the short formed parts, which only slightly extend over the length of the mounting grooves. The short formed parts are fastened to the device by means of guiding means, and they possess abutment surfaces for the positioning of the stringers. Said abutment surfaces, preferably, extend over the mounting groove such that the geometry of the cross-section of the mounting groove is larger than the geometry of the cross-section of the short formed part. This allows an adjusting of the latter in the transverse direction without the stringer touching the wall of the mounting groove.

Therefore, a major advantage of the solution according to an aspect of the invention is the position of the stringers may be adjusted individually in order to react, for example, to thermal or chemical shrinking effects or to device tolerances. In addition, the production tolerance of the device can be expanded, which allows a more simple production. By means of the solution according to an aspect of the invention, a directed guiding of the stringer during the transfer process towards the LABU and thus in the direction of the outer shell is obtained. It is not necessary any more to use large and massive form parts, but only relatively small positioning inserts, which, ideally, can be designed as identical parts. At the same time, in doing so, a much smaller cleaning effort during operation is obtained in comparison with previously known solutions.

The apparatus according to an embodiment of the invention is particularly suitable for the production of fuselage shells, in the process of which hard stringers are glued to an outer shell, which is wetted with adhesive. A completely form-giving covering of the T stringers is not required any more. However, there is still a need for a positioning, which, among other things, also solves the problem of the undercut. For this reason it must be kept in mind that the short formed parts which co-act with the stringers are equipped with sufficient draft angles. By means of the draft angles the T stringers are maintained in the formed parts in the same manner as stringers having other cross-sections, particularly, Ω stringers. Ω stringers are directly placed into the mounting grooves for positioning purposes, more precisely, without the aid of short formed parts.

The short formed parts forming the core of the present invention mainly comprise metal and are produced in a chip-generating manner to fulfill the functions according to an aspect of the invention while co-acting with the mounting groove as well as with the stringer by corresponding forming. Most preferably, the short formed parts comprise, at least partly, a magnetic material such as steel, in order to obtain a magnetic connection within the mounting groove. Insofar it is proposed to place a magnetic element on the side of the mounting groove, which, by application of magnetic force, creates the desired connection in a force-locking manner onto the short formed part. A permanent magnet is particularly suitable as a magnetic element. However, it is also possible to embody the magnetic element as an electromagnet having a magnetic field that can be switched on or off to facilitate the removal of the short formed part out of the mounting groove.

For a suitable co-action in a form-fit manner between the short formed part and the T stringer, it is proposed to insert into the short formed part a longitudinal groove, which should, preferably, show parallel groove flanks. In doing so, the groove depth of the longitudinal groove is adapted to the length of a main section (web) of the T stringer. The T stringer comprises said main section (web), which usually shows a higher wall thickness than a transverse section (stringer base) adjacent to it, which will be connected by means of an adhesive with the external skin of the fuselage shell to be produced.

By insertion of the main section into the longitudinal groove, the T stringer is positioned correctly in a simple manner. According to a measure improving the co-action of the T stringer and the longitudinal groove of the formed part it is proposed to arrange an additional clamping means between the two, which serves a connection of the T stringer in the longitudinal groove in a force-locking manner. Said clamping means is, preferably, embodied as an elastic mat, which may comprise a small-pore elastomer foam material or similar, which provides, besides the desired clamping effect according to an additional advantage, also a compensation of tolerance between the geometries of the T stringer and of the device.

The adjusters for adjusting the formed part in the transverse direction relative to the mounting groove can be embodied in a simple manner as adjusting plates arranged on both sides of the groove flanks. By selecting adjusting plates of a suitable thickness and by arranging them between the mounting groove and the formed part, any conceivable positions of the formed part can be realized in a simple manner in the transverse direction within the mounting groove. As an alternative, however, it is also conceivable to embody the adjusters as bushing units/guiding units arranged on both sides of the groove flanks or similar.

To retract the mounting device into the corresponding LABU it is necessary, in the case of more curved fuselage shells, to embody the mounting device slightly smaller in order to avoid frictions at the outer flanks. The stringer will, therefore, have to complete this path to reach its final position on the outer shell. If the stringer is not guided, this will occur arbitrarily. The folded vacuum foil takes the stringer with it without any guidance. In practice it is difficult to estimate in how far this may influence the position of the stringer, but one can assume that, with an increasing distance between the mounting device and the LABU, the imprecisions would increase, too. To avoid this, the stringer should be guided in a direction. To this end, beneath the short formed parts lifters are arranged for guiding the stringers from the mounting device to the LABU during the transfer process.

The lifters for guiding the stringers in direction of the LABU can be embodied in different manners. To this end, compression springs would be sufficient to allow a passive elevation of the formed part in relation to the mounting groove. The compression springs can, in this process, be maintained in the retracted position solely by action of the process vacuum. During the transfer process from the mounting device to the LABU at a later moment, a compensation of pressure between the two devices is performed, by means of which the formed parts are pressed out of the mounting device by means of the compression springs in direction of the LABU. Thus, additional actuators to retract the compression springs and, consequently, the formed part, are not necessary. However, should additional actuators serving as lifters for guiding the stringers in the direction of the LABU be desired, it would be recommendable to embody them in the form of pressure means cylinders for lifting of the formed parts. By means of said actuators, the positioning insert may also be retracted, in case of need, for example, in case of an undercut.

According to another aspect of the invention it is proposed that the formed parts are, at least partly, movable radially inside to avoid undercuts hindering demoulding. Because, if the fuselage shell exceeds a particular opening angle, such hindering undercuts may occur, by which a demoulding from the mounting unit after transfer to the LABU is not possible any more. The size of said opening angle depends on the geometry of the stringer, i.e., of the Ω stringer itself, or of the T stringer including the positioning insert, respectively. The undercut occurs at the outer stringers. In order to allow demoulding nevertheless, the positioning inserts may be retracted into the inside of the device. In case that several stringers are affected by the undercut hindering demoulding, the respective short formed parts can also be held together by a belt, which then guides back the formed parts together. In doing so it must be noted that a part of the cross-section of the mounting groove needs to be cut free in the direction of demoulding.

BRIEF DESCRIPTION OF THE DRAWINGS

Further aspects of the invention are, in the following, described in more detail together with a description of the preferred example of embodiment of the invention by means of the figures. The following is shown.

All figures are schematic representations.

DETAILED DESCRIPTION

Figure 1:
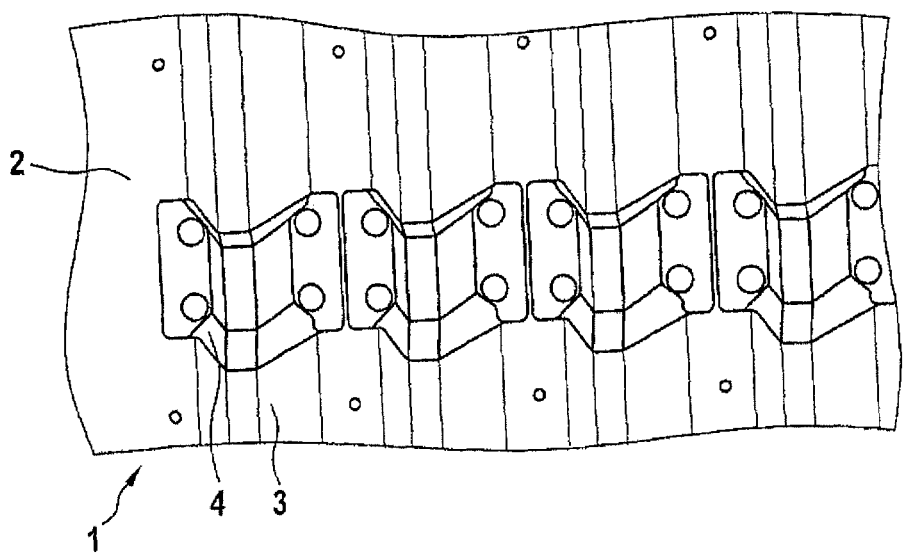
FIG. 1—a perspective view onto the mounting surface of an apparatus for the production of fuselage shells comprising a fibre composite, FIG. 2—a cross-section in the area of an exemplary mounting groove of the device according to FIG. 1, FIG. 3—a perspective view of a short formed part for the mounting groove according to FIG. 2, FIG. 4—a perspective view of a T stringer inserted into a short formed part.

According to FIG. 1, the apparatus for the production of the fuselage shells, which are not further depicted, for an aircraft essentially comprises a main frame (1), which is arranged below a mounting surface (2) for forming a supporting substructure. The outwardly curved mounting surface (2) serves the purpose of positive mounting and comprises several mounting grooves (3) running parallel for receiving formed parts—not depicted here—for the insertion of stringers. At the place where the formed parts are inserted into the mounting groove (3) there are positioning inserts (4), which can be raised by means of lifters in order to later raise the stringers inserted herein in direction of a laminating adhesive bonding unit (LABU) brought over the mounting surface (2).

Figure 2:
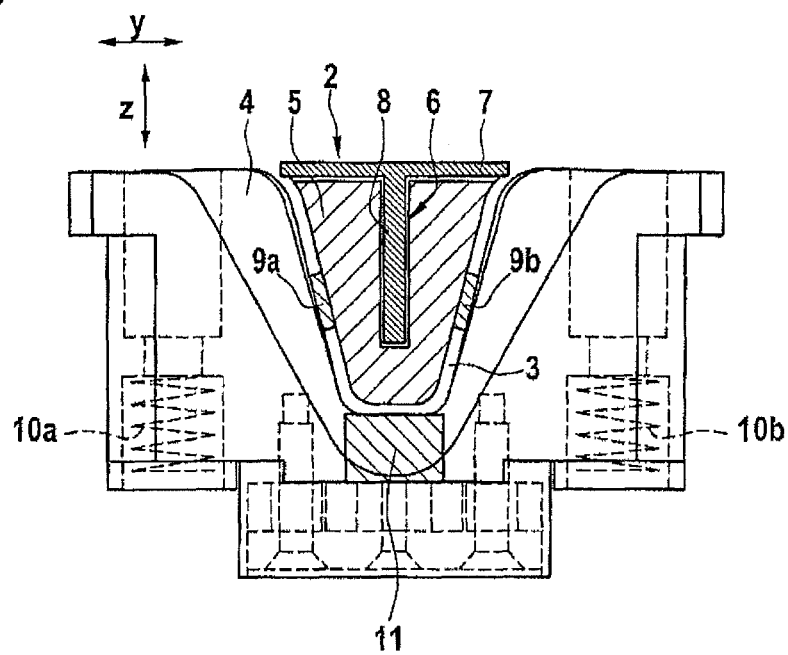

According to FIG. 2), a short formed part (5) (exemplary depiction) is inserted into the mounting groove (3) formed by the positioning insert (4). Along the longitudinal extension of each mounting groove (3) of the device, several of said short formed parts (5) are disposed spaced apart from one another to receive a T stringer (7) via its main section (8) by means of a longitudinal groove (6) which is accessible on the side of the mounting surface (2).

Each formed part (5) is adjustable relative to the corresponding mounting groove (3) in the transverse direction Y by means of adjusters, which are embodied in this example of embodiment as adjusting plates (9a, 9b) arranged on both sides of the groove flanks. By selecting the thickness of the adjusting plates (9a and 9b), a compensation of tolerance is obtained between the device and the target position of the stringer (7).

To guide the stringer (7) in the vertical direction Z mentioned above, lifters are provided, which in this example of embodiment are embodied as compression springs (10a and 10b). The compression springs (10a and 10b) are placed on both sides of the mounting groove (3) and take effect between the main frame, which is not further depicted here, and the positioning insert (4). The compression springs (10a and 10b) are maintained in the retracted position by the process vacuum.

The short formed part (5) consisting of a magnetic material is connected in a force-locking manner within the mounting groove (3a). This is performed by means of a magnetic element (11), which is embodied as a permanent magnet and arranged at the side of the mounting groove (3a).

Figure 3:
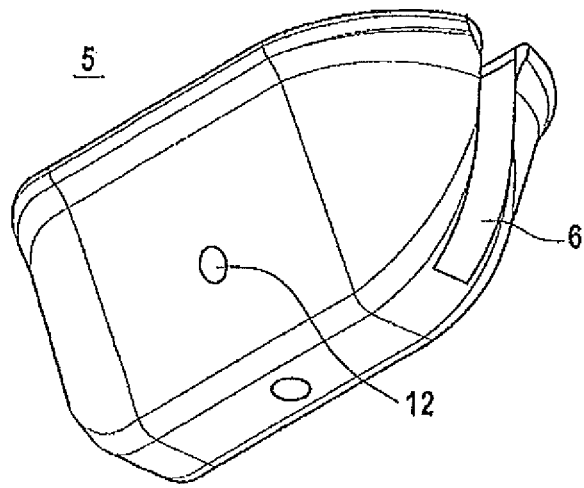

The short formed part (5) shown in FIG. 3 consists of steel as a magnetic material and is produced by a mostly chip-generating process to obtain the form shown. In doing so, the longitudinal groove (6) was generated by milling. In the area of the mounting groove, which is not further shown here, which co-acts with the mounting groove, a bushing unit (12)—roughly sketched here—is provided as adjuster in the transverse direction in this form of embodiment of the short formed part (5).

Figure 4:
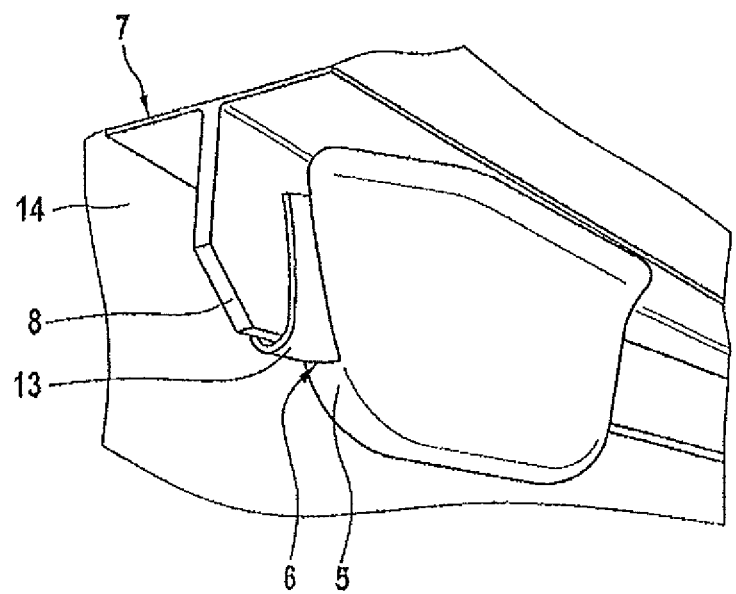

FIG. 4 shows the relative positioning of the stringer (7) to the corresponding short formed part (5) outside the other components of the device. Between the longitudinal groove (6) of the formed part (5) and the main section of (8) the stringer (7), a clamping means is provided for holding the stringer (7), which is embodied here as a T stringer, in the longitudinal groove (6). The clamping means is embodied here as an elastic mat (13), which comprises a small-pore elastomer material and, besides providing the clamping effect, it also contributes to a compensation of tolerance.

In this position, the stringer (7) is connected integrally with a fuselage shell (14) above it, which is depicted schematically and formed by several layers of a fibre composite by gluing with epoxy resin.

In addition, it is pointed out that "comprising/consisting of" does not exclude any other elements or steps and "one" does not exclude a plurality. Furthermore, it is pointed out that features or steps which are described with reference to any of the above examples of embodiment may also be used in combination with other features or steps of any other examples of embodiment described above. References in the claims are not considered to be restrictive.

LIST OF REFERENCES 1 main frame
2 mounting surface
3 mounting groove
4 positioning insert
5 formed part
6 longitudinal groove
7 stringer
8 main section
9 adjusting plate
10 compression spring
11 magnetic element
12 bushing unit
13 elastic mat
14 fuselage shell
Y transverse direction
Z vertical direction

The invention claimed is:

1. An apparatus for the production of a fuselage shell for an aircraft consisting of a fiber composite, which is to be equipped with a plurality of stringers disposed spaced apart for reinforcement, comprising:
a main frame forming a supporting sub-structure having an outwardly curved mounting surface for positive mounting having a plurality of longitudinal mounting grooves for receiving of a plurality of formed parts in a form-fit manner for deformably positioning the stringers relative to the mounting surface,
wherein a plurality of short formed parts are disposed spaced apart from each other in each mounting groove;
wherein the stringers are adjustable by an adjuster relative to the corresponding mounting groove in the transverse direction (Y) defined from a first side of the groove to a second side of the groove, and configured to be moved in the vertical direction (Z) in or out of the groove by at least first and second lifters for guiding the stringers in the direction of a laminating adhesive bonding unit brought over the mounting surface.

2. The apparatus according to claim 1, wherein the short formed part comprises at least partly, a magnetic material to allow the connection of the formed part in a force locking manner within the mounting groove in the process of co-action with a corresponding magnetic element arranged at the side of the mounting groove.

3. The apparatus according to claim 1, wherein the short formed part is configured for receiving a T stringer and comprises a longitudinal groove having parallel groove flanks, the groove depth of which is adapted to the length of a main section of the T stringer.

4. The apparatus according to claim 3, wherein between the longitudinal groove of the formed part and the main section of the T stringer a clamping means to hold the T stringer is arranged within the longitudinal groove.

5. The apparatus according to claim 4, wherein the clamping means comprises an elastic mat.

6. The apparatus according to claim 1, wherein the adjuster comprises first and second adjusting plates arranged on first and second sides of the groove flanks, respectively.

7. The apparatus according to claim 1, wherein the adjuster comprises first and second bushing units arranged on first and second sides of the groove flanks, respectively.

8. The apparatus according to claim 1, wherein the lifters comprise first and second compression springs for raising a positioning insert out of the mounting groove.

9. The apparatus according to claim 8, wherein the first and second compression springs are configured to be kept in the retracted position by action of process vacuum.

10. The apparatus according to claim 8, wherein the positioning insert to avoid undercuts hindering demoulding are, at least partly, movable from the curved mounting surface towards the radial inside.

11. The apparatus according to claim 1, wherein the lifters comprise pressure cylinders to raise a positioning insert out of the mounting groove.

* * * * *